March 17, 1936.  H. E. WARREN  2,034,499
SYNCHRONOUS MOTOR
Filed June 21, 1934

Inventor:
Henry E. Warren,
by *Harry E. Dunham*
His Attorney.

Patented Mar. 17, 1936

2,034,499

UNITED STATES PATENT OFFICE 2,034,499

SYNCHRONOUS MOTOR

Henry E. Warren, Ashland, Mass., assignor to Warren Telechron Company, Ashland, Mass., a corporation of Maine Application June 21, 1934, Serial No. 731,629

6 Claims. (Cl. 172—275)

My invention relates to improvements in non-self-starting synchronous motors of the character described in the United States Patent No. 1,835,505, Liner, December 8, 1931, using a staggered tooth arrangement of salient poles to assist in synchronizing.

One object of my invention is to reduce the cost of manufacture of such motor. Another object of my invention is to reduce the inertia and friction of such motors whereby for a given field flux the rotor will more readily move endwise in the synchronizing operation. Another object of my invention is to reduce the excitation requirements of such motors and render them more quiet in operation.

In carrying my invention into effect, I make the element, either the rotor or the stator, having the staggered pole arrangement from a single sheet of magnetic material. This reduces the cost of manufacture, reduces the ratio of the reluctance of the magnetic circuit to the amount of material used therein at the instant of synchronization, and reduces the conditions which tend to cause vibration and noise. Where the staggered-pole element is made the rotor of the motor, the single disc reduces the moment of inertia of the rotor and makes it that much more easy to move endwise in response to the flux pulsation at the instant of synchronization. I prefer also to reduce the friction factor of the rotating element of the motor to a minimum by so arranging the stator pole pieces with respect to the rotor as to provide a magnetic-lifting tendency on the rotor which is about equal to the weight of the rotating element. All of these features contribute to low cost and quietness in operation and make it unnecessary to provide auxiliary friction and inertia devices associated with the rotor to assist in establishing synchronization.

Figure 1:
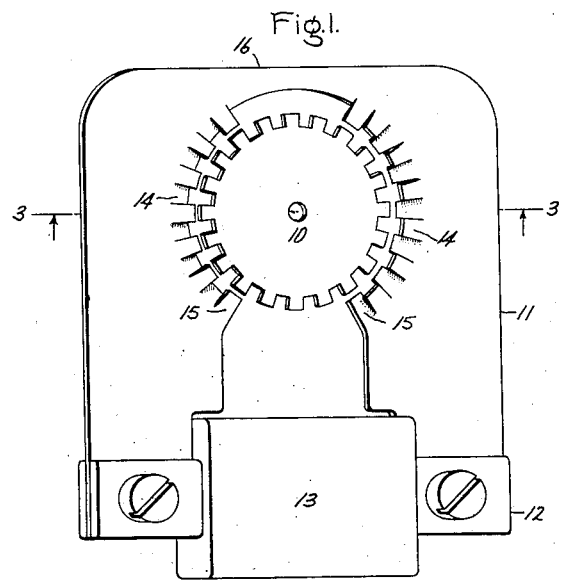
Figure 2:
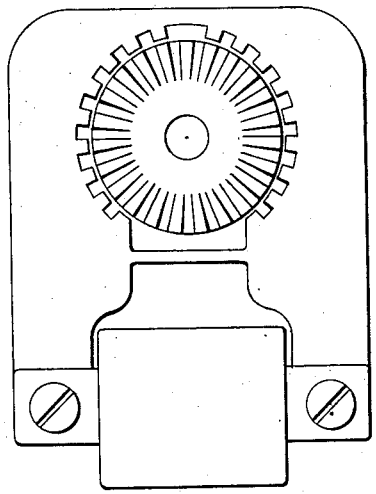

The features of my invention which are believed to be novel and patentable will be pointed out in the claims appended hereto. For a better understanding of my invention, reference is made in the following description to the accompanying drawing in which Fig. 1 represents a preferred embodiment of my invention where the stator is provided with a double row of staggered salient poles or teeth; Fig. 2 represents a modification wherein the rotor teeth are staggered; and Fig. 3 represents a section through the motor along line 3—3 of Fig. 1, but including the motor shaft and bearings.

Figure 3:
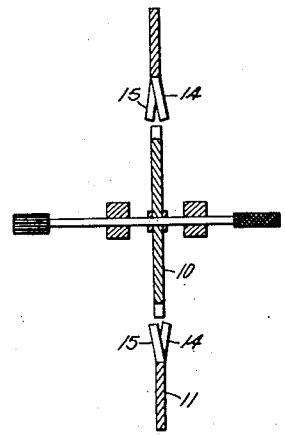

Referring to the motor of Figs. 1 and 3, it will be noted that the rotor consists of a single magnetic disc 10 provided with a single row of salient pole teeth in its periphery. The stator of the motor consists of a single sheet of magnetic material 11 extending from the core 12 of a single-phase coil 13. The sheet 11 embraces the rotor in bipolar relation and each main pole has adjacent rows of teeth 14 and 15 cut in their pole faces adjacent the rotor. The two rows of teeth are formed by staggering alternate teeth, the teeth in each row having the same spacing as the teeth in the rotor. This formation of the stator teeth may be accomplished by a single stamping operation. The material between adjacent teeth is cut back a sufficient distance to enable the teeth to be readily bent into positions inclined in opposite directions from the plane of the sheet to form the two rows such that the teeth in one row do not touch the teeth in the adjacent row except near the base where they are all integral with the sheet 11.

Such a motor is started by spinning the rotor by hand to bring it up to slightly above synchronous speed with the field energized. The rotor will then slow down and, at synchronous speed, will fall into synchronism utilizing one or the other of the two rows of teeth. Since these staggered teeth are one-half rotor tooth pitch apart in a peripheral direction, it is easy to obtain a speed, rotor position, and substantially in-phase flux condition favorable to the establishment of synchronization without additional complications. The rotor will be pulled endwise slightly to align with that row of stator teeth most favorable to this condition after which the motor will operate synchronously, utilizing the salient stator poles in one row only.

The rotor in both Figures 1 and 2 consists of a single disc which can be made sufficiently light in weight as to offer no serious inertia effect to such endwise movement of the rotor at the instant of synchronizing. To still further reduce resistance to endwise movement of the rotor, I arrange the stator magnetic material to provide a magnetic lifting tendency on the rotor and thus reduce its bearing friction to a minimum. In Fig. 1, this is done by using an extension 16 integral with the sheet 11 between the bipolar sections about the rotor. This section of magnetic material is made sufficiently thin as to readily saturate and therefore does not divert any substantial amount of flux from the rotor, but its presence tends to increase the amount of flux which crosses the rotor above the rotor axis and as a consequence there is a magnetic-lifting action on the rotor sufficient to reduce bearing friction to a minimum. This result is not only beneficial when the motor is being synchronized by reducing resistance to endwise movement of the motor but it is also beneficial in reducing friction losses and bearing wear during normal operation.

In Fig. 2 the stator teeth are not staggered but the rotor is provided with two rows of teeth, the teeth in the different rows alternating with each other and the number of teeth in each row being spaced the same as in the stator. The action of this motor is the same as that of Fig. 1.

The arrangement of Fig. 1 is somewhat preferable from the standpoint of manufacture because, in Fig. 2, the widths of rotor teeth decrease away from the periphery making them somewhat weaker in structure and requiring a more expensive and exact die construction for their formation than is the case with the staggered stator teeth of Fig. 1 where the width of the teeth increase in size at the base.

In Fig. 2 a magnetic-lifting effect on the rotor is obtained by providing more stator teeth above the axis of the rotor than below.

While more than two rows of teeth might be used on the stator of Fig. 1 or the rotor of Fig. 2, I have found that two rows are sufficient where the motor is otherwise constructed in accordance with this invention where the rotor is of low inertia and is readily movable endwise in response to the flux pulsations which predominate at the instant of synchronizing.

In a motor of this type, the maximum flux and excitation requirement occur at the instant of synchronizing. At this time, the flux must be sufficient to pull the rotor endwise by a slight amount in a very short space of time. If the rotor is heavy and the reluctance of the magnetic circuit is high, such a motor requires an excessive amount of excitation in order to be successful, that is, an amount of excitation considerably more than is required during normal operation. The higher the excitation of the motor, the greater its losses but what is more important in motors of this character, which are generally used for operating clocks and other timing devices, the heavy excitation makes the motor noisy in operation because every part which is capable of vibrating tends to vibrate in synchronism with the alternating flux pulsations or at some harmonic thereof.

By means of my invention, a motor of this character is feasible using very moderate excitation. The inertia of the rotor is low, the bearing friction is reduced to a minimum, all of the teeth in the two rows are integral with the single-sheet stator or rotor as the case may be and no flux is required to cross from one lamination to another to reach the active row of teeth at the instant of synchronizing. The use of two rather than three rows of staggered poles contributes to the concentration of the flux and make it more effective in pulling the rotor endwise. All of these factors contribute to low excitation requirements and quietness in operation. The single-lamination stator and rotor structure also contribute to quietness in operation since then we do not have different laminations vibrating against each other.

What I claim as new and desire to secure by Letters Patent of the United States is:

1. An alternating-current synchronous motor having stator and rotor salient pole magnetic parts in cooperate relation, one part having two axially-spaced rows of salient pole projections extending from and integral with a sheet of magnetic material, and the other part having a single row of such projections, the polar pitch of the projections in the different rows being equal but the projection in the two axially-spaced rows being staggered so as to be one-half pole pitch apart, said parts being so mounted as to permit relative axial movement of said parts so as to utilize either one of the axially-spaced rows of pole projections in the operation of the motor and means for producing an alternating flux between said parts.

2. An alternating-current synchronous motor having stator and rotor parts, the rotor part comprising a magnetic disc with polar teeth in its periphery, supporting means therefor so mounted as to permit of axial and rotational movement of said rotor part, the stator part comprising a bipolar field structure made from a single sheet of magnetic material energized from a single-phase magnet, the pole faces of said bipolar structure being cut to form teeth with alternate teeth inclined in opposite directions from the plane of the sheet to form a double row facing the rotor, the teeth in each row having the same polar pitch as the rotor teeth.

3. A nonself-starting alternating-current synchronous motor comprising cooperating stator and rotor parts, said parts having a plurality of salient magnetic pole pieces, means on said stator for producing an alternating flux through the salient pole pieces on stator and rotor parts, one of said parts being formed from a single sheet of magnetic material which is included in the flux path of the motor and provided with a plurality of axially spaced rows of salient pole projections integral with said sheet, the projections in the different rows being staggered in non-overlapping relation, and bearing means for said rotor arranged to permit of axial movement of the rotor whereby any one of said axially-spaced rows of salient pole projections may be utilized in the operation of a motor.

4. An alternating-current synchronous motor comprising cooperating stator and rotor parts, the motor having a horizontal rotor axis of rotation with rotor-supporting bearings permitting axial as well as rotational movement of the rotor, the rotor having different axially displaced operating positions, a plurality of cooperating salient magnetic pole pieces on stator and rotor parts, a single-phase coil for producing alternating fluxes through the salient pole pieces on stator and rotor, said rotor and stator parts being so relatively positioned as to cause the flux of the motor to produce a magnetic-lifting action on the rotor to reduce bearing friction in any of said axially displaced operating positions of the rotor, one of said parts having a plurality of axially-displaced rows of polar projections, the poles in the different rows being staggered with respect to each other to facilitate establishing synchronous operation with any one of said rows of polar projections upon endwise movement of the rotor.

5. An alternating-current synchronous motor having cooperating stator and rotor parts, said stator comprising a single-phase magnet for energizing said motor and a single sheet of magnetic material extending from said magnet and embracing the rotor in bipolar relation and provided with two axially-spaced rows of salient pole teeth formed integral with said sheet adjacent the rotor, the teeth in the two rows having the same polar pitch but the teeth in one row being staggered with respect to the teeth in the other row, said rotor comprising a unitary magnetic disc with peripheral teeth having the same polar pitch as the teeth in one of the rows of stator teeth and being rotatively mounted on bearings permitting axial movement of the rotor and alignment of the rotor disc with either row of stator teeth.

6. A synchronous alternating-current motor comprising stator and rotor parts, the stator consisting of a single-phase coil and core together with a single sheet of magnetic material extending from the core and embracing the rotor in bipolar relation and having salient pole pieces cut in the edge of said sheet adjacent the rotor, the rotor comprising a unitary disc of magnetic material so mounted as to permit axial and rotational movement thereof and having its periphery slotted to form a plurality of teeth, alternate teeth being inclined in opposite direction from the plane of the disc to form two axially-displaced rows of salient poles of the same polar pitch as the stator poles.

HENRY E. WARREN.